United States Patent Office 3,243,431
Patented Mar. 29, 1966

3,243,431
5α-HYDROXY-6β-AMINO STEROIDS AND THE PREPARATION THEREOF
Colin Leslie Hewett, Glasgow, and David Samuel Savage, Renfrewshire, Scotland, assignors to Organon Inc., West Orange, N.J., a corporation of New Jersey
No Drawing. Filed July 23, 1964, Ser. No. 384,797
2 Claims. (Cl. 260—239.5)

The invention relates to novel 6β-amino steroids and to a process for the preparation thereof and to salts thereof. According to the invention there is provided a process which comprises reacting a 5α,6α-oxido steroid of the androstane or pregnane series with a compound of the formula $HNR_1R_2$, wherein $R_1$ represents hydrogen, a lower alkyl group or a substituted lower alkyl group, $R_2$ represents a lower alkyl group or a substituted lower alkyl group, or $NR_1R_2$ represents a heterocyclic amino radical, to form the corresponding 5α-hydroxy-6β-amino-steroid.

In particular, the invention relates to a process wherein a 5α,6α-oxido steroid having the formula:

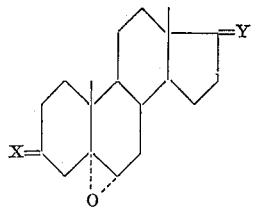

in which X represents H(OH) or H(OAcyl); Y represents H(βOH), H(βOAcyl), =O, H(COCH₃), H(CHOHCH₃) or H(CHOAcylCH₃)

is reacted with an amine having the formula $HNR_1R_2$, wherein $R_1$ represents hydrogen, a lower alkyl group or a substituted lower alkyl group, $R_2$ represents a lower alkyl group or a substituted lower alkyl group, or $NR_1R_2$ represents a heterocyclic amino radical, to form a compound having the formula:

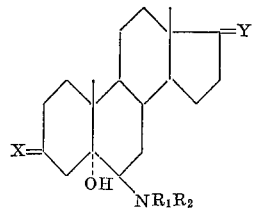

in which X, Y, $R_1$ and $R_2$ have the meaning given above.

The invention further relates to novel 5α-hydroxy-6β-amino steroids of the pregnane and androstane series, with special reference to 6β-amino steroids having the formula:

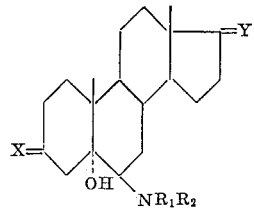

in which $R_1$ represents hydrogen, a lower alkyl group or a substituted lower alkyl group, $R_2$ represents a lower alkyl group or a substituted lower alkyl group, or $NR_1R_2$ represents a heterocyclic amino radical, X represents H(OH) or H(OAcyl) and Y represents H(βOH), H(βOAcyl), =O, H(COCH₃), H(CHOHCH₃) or H(CHOAcylCH₃).

The 5α-hydroxy-6β-amino steroids, which are the new compounds of the invention, possess important biological activities. They are central nervous system stimulants and depressant, possessing anaesthetic, sedative, anticholinergic and hypotensive properties.

The starting materials used in the proces herein decribed consist of 5α,6α-oxido-steroids and, in particular, compounds having the formula:

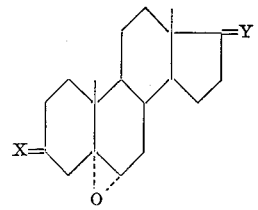

wherein X and Y have the meanings given above.

The said 5α,6α-oxido steroids may be prepared by epoxidising the corresponding Δ⁵-steroid using, for example, an organic peracid such as perbenzoic acid or perphthalic acid.

The 5α,6α-oxido steroids are converted into the corresponding 5α-hydroxy-6β-amino steroids by reacting with a compound of the general formula $H.NR_1R_2$ in which $R_1$ and $R_2$ have the meanings given above. It has been found that the presence of water accelerates the reaction between the 5α,6α-oxido steroid and the compound $H.NR_1R_2$. If desired, the reaction may be carried out in the presence of a suitable organic solvent. The reaction is preferably carried out at the boiling point of the compound $H.NR_1R_2$, or the solvent, if used, for some time, for example 50 to 80 hours. If water is added to the reaction mixture the time may be reduced to 20 hours.

The following are examples of the compounds according to the formula $H.N.R_1R_2$ which may be used in the process of the present invention; methylamine, ethylamine, propylamine, butylamine, dimethylamine, diethylamine, morpholine, piperidine, piperazine and pyrrolidine.

Starting with the 3-, 17- or 20-acyloxy-5α,6α-oxido-steroids there is obtained a mixture of the corresponding 3-, 17- or 20-acyloxy and free hydroxy-5α-hydroxy-6β-amino steroid which are readily separable. The degree of hydrolysis of the acyloxy groups depends on the reaction time and the amount of water present. The acyloxy compounds may be hydrolysed to the corresponding free hydroxy compounds with alkali in a known manner, likewise the free hydroxy groups, except the 5α-hydroxy group, may be esterified in the usual way.

Where the starting 5α,6α-oxido steroid contains a keto group this may be converted into a hydroxyl group by reduction either in the starting oxide or in the 5α-hydroxy 6β-amino steroid compound prepared from the keto-oxide. For example, the 5α-hydroxy-6β-amino-17-keto-steroids may be converted to the corresponding 5α-17β-dihydroxy-6β-amino steroids by reduction.

As reducing agents may be used, for example, sodium borohydride in methanol. In a similar manner, the 20-ketone in a 5α-hydroxy-6β-amino-20-keto-steroid may be reduced to a 20-hydroxy group. When sodium or potassium borohydride is used for this reduction any 3-acyloxy group remains unchanged and esterification will yield mixed esters.

Any secondary hydroxy group present in the 5α-hydroxy-6β-amino steroids or any secondary acyloxy group after saponification, for example, the 3-hydroxy, 17-hydroxy and 20-hydroxy may be converted into the corresponding ketone by oxidation, for example, according to the Oppenauer method or by means of chromium trioxide.

The 5α-hydroxy-6β-amino-steroids according to the present invention may be converted into salts thereof, for example, organic salts such as citrates, or pyruvates or inorganic salts such as the hydrochlorides or they may be converted into the quaternary ammonium salts with alkylhalides.

The invention is illustrated further by the following examples.

Example I

A solution of 5α,6α-epoxy-pregnan-3β-ol-20-one (5.6 gm.) in morpholine (15 ml.) was refluxed for 5 days, the solution cooled and the product precipitated by the addition of water. The white solid was filtered off, washed well with water, dried and suspended in boiling ether (300 ml.) for 5 minutes, cooled and the sparingly soluble crystalline solid filtered off (3.6 gm.) M.P. 255–265°. Recrystallisation from acetone gave 6β-morpholino 5α-pregnan-3β,5α-diol-20-one as small prisms, M.P. 276–280° (dec.), $[\alpha]_D$ −11.4° (c. 0.2). The 3-acetate, prepared from the diol (500 mg.) in acetic anhydride (4 ml.) and pyridine (4 ml.) at 100° for 6 hours, crystallised from ether in small prisms, M.P. 228–230° (dec.). Recrystallisation from acetone-ether gave prisms, M.P. 228–230° (dec.), $[\alpha]_D$ −12° (c. 0.4).

In the same manner other 3-esters have been prepared derived from valeric acid, capric acid, lauric acid and β-phenyl propionic acid.

Hydrolysis of the 3β-mono-acetate (200 mg.) with potassium carbonate (250 mg.) in water (2.5 ml.) and methanol (20 ml.) at the boil for 40 minutes yielded the original diol, M.P. 272–276°.

Example II

A solution of 5α,6α-epoxy-pregnan-3β-ol-20-one 3-acetate (20 gm.) in morpholine (50 ml.) was refluxed for 10 days; the solution was cooled and water added to precipitate a sticky solid which gradually hardened on stirring to a white solid. After washing well with water the product was crystallised from acetone to give several crops (total 12.2 gm.) consisting essentially of crude diol, M.P. 202–270° (dec.).

The material obtained from the acetone mother liquors after filtering through alumina in ethereal solution, gave the 3-acetate (4.5 gm.), M.P. 224–228° (dec.).

The crude diol (12.2 gm.) in methanol (350 ml.) was boiled under reflux for 1 hour with potassium carbonate (10 gm.) in water (12 ml.). After addition of water the pure 6β-morpholino-5α-pregnan-3β,5α-diol-20-one was filtered off and dried (9.2 gm.), M.P. 274–278° (dec.).

Example III

A solution of 5α,6α-epoxy-pregnan-3β-ol-20-one 3-acetate (5 g.) in morpholine (20 ml.) and water (10 ml.) was boiled under reflux for 20 hours. Addition of water to the cooled solution precipitated the product which was filtered, washed with water and hydrolysed with 4% aqueous methanolic potassium hydroxide solution. The suspension was concentrated and the sparingly soluble morpholino-diol (4.4 g.), M.P. 270–277° (dec.), filtered off.

Example IV

Sodium borohydride (1 g.) was added over 20 minutes to a solution of 6β-morpholino-5α-pregnan-3β,5α-diol-20-one 3β-acetate (2.8 g.) in methanol (100 ml.) and the solution allowed to stand at 20° for 1 hour. A crystalline material had precipitated out and addition of water yielded a crystalline product which was recrystallised from acetone in small prisms (1.85 g.) of 6β-morpholino-5α-pregnan-3β,5α,20β-triol 3β-acetate, M.P. 268–270°, $[\alpha]_D$ −70.1° (c. 0.5).

A solution of potassium carbonate (3 g.) in water (15 ml.) was added to a solution of the triol-monoacetate (1.8 g.) in methanol (50 ml.) and the mixture refluxed for 1 hour. The product was precipitated from the cooled solution by addition of water, filtered off and crystallised from acetone yielding the triol in small needles (1.4 g.), M.P. 234–238° (dec.), $[\alpha]_D$ −61.6° (c. 1.0).

Example V

A solution of 3β,20β-diacetoxy-5α,6α-epoxy-pregnane (7.9 g.) in morpholine (34 ml.) and water (8 ml.) was boiled under reflux for 42 hours, concentrated almost to dryness, and water added to precipitate a buff-coloured solid which was filtered off and well washed with water.

This dried solid was dissolved in ether (50 ml.) and the solution filtered down a column (6" x 1½" dia.) of alumina. Elution with ether (125 ml.) yielded a clear gum which was dissolved in ether, light petrol (B.P. −40/60) added and the ether distilled off precipitating a crystalline solid (3.4 g.), M.P. 206–208°; recrystallisation from ether yielded 3β,20β-diacetoxy-6β-morpholino-5α-pregnan-5α-ol in heavy prisms, M.P. 206–208°, $[\alpha]_D$ −37°.

Further elution with ether (1.5 l.) yielded fractions (2.8 g.), melting range 230–244°. Recrystallisation from ether yielded 20β-acetoxy-6β-morpholino-5α-pregnan-3β,5α-diol in fine needles, M.P. 243–245°.

Elution with methanol (250 ml.) and evaporation of the solvent gave a brown crystalline solid which was recrystallised from acetone to give 6β-morpholino-5α-pregnan-3β,5α,20β-triol in small needles (250 mg.), M.P. 235–239° (dec.); the melting point was undepressed on admixture with an authentic specimen.

Example VI

A solution of 5α,6α-epoxy-pregnan-3β-ol-20-one 3β-acetate (10 g.) in water piperidine was refluxed for 70 hours (1:1, 60 ml.). The product, precipitated as a yellow gum by the addition of water to the cooled reactant solution, was extracted with ether, the extract dried (NaSO₄), and the solution evaporated to dryness. The residual yellow gum was hydrolysed in the usual manner, in aqueous methanolic potassium carbonate solution, the product extracted with ether and concentrated to give a crop of fine needles (5.3 g.), M.P. 170–174° (dec.). Recrystallisation from ether gave the piperidino-diol in fine needles, M.P. 170–174° (dec.).

Perchloric acid (0.1 ml.) was added to a solution of the piperidino-diol (2.75 g.) in acetic anhydride (2 ml.), acetic acid (15 ml.) and 30% hydrogen bromide; acetic acid (2 ml.) and the solution allowed to stand at 20° for 30 minutes. Careful addition of 50% aqueous potassium hydroxide solution precipitated a solid which was filtered off and recrystallised from ether to give needles, M.P. 188–190°, softening ca 140°. Recrystallisation from ether gave the monoacetate in needles, M.P. 188–190°, $[\alpha]_D$ −21.5° (c. 2).

In the same way this compound has been converted into the 3β-acylates derived from butyric acid, oenanthic acid, β-phenyl propionic acid, and succinic acid.

Example VII

A suspension of 5α,6α-epoxy-pregnan-3β-ol-20-one (10 g.) in piperazine-hexahydrate was refluxed for 72 hours. Water (30 ml.) was added to the cooled mixture and the resulting suspension filtered. The insoluble white solid was well washed with water, dried and suspended in boiling acetone. A sparingly soluble white crystalline solid (8 g.), M.P. 250–260° (dec.) was filtered off. Recrystallisation from methanol-acetone yielded the piperazino-diol in plates, M.P. 260–275° (dec.), [α]$_D$ −9° (c. 0.3).

Example VIII

A solution of 5α,6α-epoxy-pregnan-3β-ol-20-one 3β-acetate (10 gm.) in water:butylamine (1:3, 40 ml.) was refluxed for 70 hours. The solution was evaporated to dryness under reduced pressure and the residual yellow gum hydrolysed in the usual manner in aqueous methanolic potassium carbonate solution. The product was dissolved in benzene, filtered down a column (3″ x 1″ dia.) of alumina, and eluted with benzene (200 ml.). Evaporation of the benzene and crystallisation of the residual yellow gum from ether gave small prisms (7 g.), M.P. 198–202°. Recrystallisation from ether gave 6β-butylamino-5α-pregnan-3β,5α-diol-20-one in prisms, M.P. 198–202°, [α]$_D$ +24° (c. 2).

In the same way, using methylamine, propylamine and diethylamine the above-mentioned 5α,6α-epoxy-compound has been converted into the corresponding 5α-hydroxy-6β-amino-derivatives.

Example IX

A solution of 5α,6α-epoxy-androstan-3β-ol-17-one 3β-acetate (20 g.) in morpholine (40 ml.) was refluxed for 10 days, the solution cooled, and water added to precipitate a yellow solid which was taken up in methanol (150 ml.), a solution of potassium carbonate (10 g.) in water (30 ml.) added, and the solution refluxed for 1 hour. The suspension was cooled and the sparingly soluble crystalline material (12.3 g.), M.P. 268–280° filtered off and washed with ice-cold methanol (10 ml.).

Recrystallisation of this material from acetone gave 6β-morpholino-5α-androstan-3β,5α-diol-17-one in needles, M.P. 282–286° (dec.), [α]$_D$ −9° (c. 0.3).

A suspension of the morpholino-diol (2 g.) in pyridine (14 ml.) and acetic anhydride (14 ml.) was heated into solution at 100° for 1 hour. The product, precipitated from the cooled solution by the addition of water, was extracted with ether, the extract well washed with water and dried (NaSO$_4$). The concentrated extract was filtered down a column (3″ x 1″) of alumina and the ether eluate (500 ml.) concentrated and crystallisation effected from acetone to give 6β-morpholino-5α-androstan-3β,5α-diol-17-one 3β-acetate as large prisms, M.P. 177–179°, [α]$_D$ −14.8° (c. 0.4).

In an analogous manner the 3β-acylates derived from propionic acid, caproic acid, β-phenyl propionic acid and palmitic acid have been prepared.

Example X

Sodium borohydride (0.25 g.) was added over 15 minutes to a stirred solution of 6β-morpholino-5α-androstan-3β-5α-diol-17-one (1 g.) in methanol (60 ml.) and stirring continued for 2 hours. Addition of a 5% solution of potassium hydroxide precipitated a white solid which was filtered off and crystallised from acetone to give 6β-morpholino-5α-androstan-3β,5α-17β-triol in small needles (700 mg.), M.P. 233–236°, [α]$_D$ −58.6° (c. 1).

Example XI

Soduim borohydride (1 g.) was added over 20 minutes to a stirred solution of 6β-morpholino-5α-androstan-3β,5α-diol-17-one 3β-acetate (3 g.) in methanol (20 ml.) and stirring continued for 1 hour at 20°. Addition of water precipitated the product as a white crystalline solid (2.73 g.), which was filtered off and recrystallised from aqueous acetone to give the triol-monoacetate, in small needles, M.P. 185–189°, [α]$_D$ −70° (c. 2).

Example XII

A solution of 3β,17β-diacetoxy-5α,6α-epoxy-androstane (10 g.) in morpholino (32 ml.) and water (8 ml.) was boiled under reflux for 66 hours, and the solution evaporated to dryness under reduced pressure to give a brown gum which gave a light brown crystalline solid on stirring with water. This solid was filtered off, dried at 47° under reduced pressure, and finely ground before extracting well with either. The sparingly soluble material (4.5 g.) was dissolved in acetone, boiled with charcoal, filtered and concentrated to give 6β-morpholino-5α-androstan-3β, 5α,17β-triol in small needles, M.P. 235–238°.

The ether mother liquors were concentrated (to 50 ml.) and filtered down a column (6″ x 1″) of alumina. Elution with ether (70 ml.) gave a fraction (3 g.), M.P. 138–143°. Recrystallisation from ether gave 3β,17β-diacetoxy-6β-morpholino-5α-androstan-5α-ol in small needles, M.P. 145–149°, [α]$_D$ −68° (c. 2).

Further elution with ether and recrystallisation from ether gave 17β-acetoxy-6β-morpholino-5α-androstan-3β, 5α-diol in micro-needles, M.P. 238–240°, [α]$_D$ −58° (c. 0.8).

Example XIII

A suspension of 5α,6α-epoxy-androstan-3β-ol-17-one 3β-acetate (10 g.) in piperidine:water (3:1, 40 ml.) was refluxed for 22 hours. Addition of water precipitated a gum which was taken up in 3% aqueous methanolic potassium hydroxide solution (70 ml.) and refluxed for 1 hour. A heavy crystalline solid (9 g.) deposited and was recrystallised from acetone in needles, M.P. 210–212°. Recrystallisation from ether gave the piperidino-diol in small needles, M.P. 205–207°, [α]$_D$ +3.5° (c. 2).

In an analogous manner 5α-6α-epoxy-androstan-3β-ol-17-one 3β-acetate has been converted into the corresponding 3β,5α-dihydroxy-6β-amino compounds, of which the amino group is derived from ethylamine, dimethylamine and propylamine.

The piperidino-diol (5.4 g.) was acetylated in the usual manner with acetic anhydride, 30% hydrogen bromide:acetic acid, and a catalytic amount of perchloric acid. Crystallisation from ether gave the 3β-monoacetate in rods, M.P. 120–123°, [α]$_D$ −17° (c. 2).

In an analogous way the 3β-mono acylates derived from trimethyl acetic acid, oenanthic acid, capric acid, β-phenyl propionic acid and stearic acid have been prepared.

We claim:

1. Steroids of the formula:

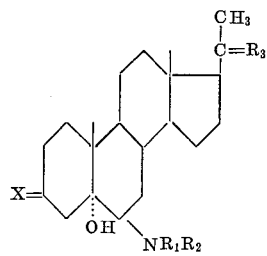

in which
X is selected from the group consisting of H(OH) and H(OAcyl),
R$_1$ and R$_2$ are selected from the group consisting of hydrogen, a lower alkyl group, and a substituted lower alkyl group, R$_1$ and R$_2$ not being hydrogen simultaneously, and when taken together form with the nitrogen atom a heterocyclic ring selected from the group consisting of morpholine, piperidine, piperazine and pyrrolidine, and
R$_3$ is selected from the group consisting of O, H(OH) and H(OAcyl), in which the acyl group is derived from an organic carboxylic acid having 1–18 carbon atoms.

2. Salts of the compounds of claim 1 wherein the salt is selected from the group consisting of quaternary ammonium salts and the acid-addition salts derived from organic and inorganic acids.

References Cited by the Examiner

UNITED STATES PATENTS 3,123,623  3/1946  Sassaki _____ 260—397.3
3,156,710  11/1964  Sassaki _____ 260—349

OTHER REFERENCES

Batres et al.: J. Org. Chem., vol. 26, pp. 878–80 (1961).

LEWIS GOTTS, *Primary Examiner*.

HENRY A. FRENCH, *Assistant Examiner*.